United States Patent
Sterchi et al.

(10) Patent No.: US 7,667,705 B2
(45) Date of Patent: Feb. 23, 2010

(54) SYSTEM AND METHOD FOR CONTROLLING ANIMATION BY TAGGING OBJECTS WITHIN A GAME ENVIRONMENT

(75) Inventors: Henry Sterchi, Redmond, WA (US); Jeff Kalles, Redmond, WA (US); Shigeru Miyamoto, Kyoto (JP); Denis Dyack, St. Catharines (CA); Carey Murray, Burlington (CA)

(73) Assignee: Nintendo of America Inc., Redmond, WA (US)

( * ) Notice: Subject to any disclaimer, the term of this patent is extended or adjusted under 35 U.S.C. 154(b) by 897 days.

(21) Appl. No.: 10/078,526

(22) Filed: Feb. 21, 2002

(65) Prior Publication Data

US 2002/0171647 A1 Nov. 21, 2002

Related U.S. Application Data

(60) Provisional application No. 60/290,688, filed on May 15, 2001, provisional application No. 60/314,289, filed on Aug. 24, 2001.

(51) Int. Cl.
*G06T 15/70* (2006.01)

(52) U.S. Cl. .................................................... 345/474

(58) Field of Classification Search ................. 345/418, 345/473–475
See application file for complete search history.

(56) References Cited

U.S. PATENT DOCUMENTS

| | | | |
|---|---|---|---|
| 6,009,458 A | 12/1999 | Hawkins et al. | 709/203 |
| 6,191,798 B1 * | 2/2001 | Handelman et al. | 345/473 |
| 6,366,285 B1 * | 4/2002 | Brush et al. | 345/473 |
| 6,545,682 B1 * | 4/2003 | Ventrella et al. | 345/473 |
| 2003/0206170 A1 * | 11/2003 | Bickmore et al. | |

FOREIGN PATENT DOCUMENTS

JP 10-290886 11/1998

* cited by examiner

*Primary Examiner*—Peter-Anthony Pappas
(74) *Attorney, Agent, or Firm*—Nixon & Vanderhye P.C.

(57) ABSTRACT

A game developer can "tag" an item in the game environment. When an animated character walks near the "tagged" item, the animation engine can cause the character's head to turn toward the item, and mathematically computes what needs to be done in order to make the action look real and normal. The tag can also be modified to elicit an emotional response from the character. For example, a tagged enemy can cause fear, while a tagged inanimate object may cause only indifference or indifferent interest.

16 Claims, 18 Drawing Sheets

SYSTEM AND METHOD FOR CONTROLLING ANIMATION BY TAGGING OBJECTS WITHIN A GAME ENVIRONMENT

RELATED APPLICATION

This application claims the benefit of U.S. provisional application Ser. No. 60/290,688 filed May 15, 2001, and U.S. provisional application Ser. No. 60/314,289 filed Aug. 24, 2001, the contents of which are incorporated reference herein in their entirety.

FIELD OF THE INVENTION

The present invention relates to computer graphics and more particularly to the use of computers to generate animated displays. Still more particularly, the invention relates to techniques for automatically controlling animation within a video game or other graphical presentation. In particular, the invention provides a reactive animation system that enables game characters or other graphical characters to appear much more realistic as they interact with a virtual world in which they are displayed. The reactive animation system enables, for example, the creation virtual worlds where the character(s) therein will do things, such as have a facial, body or other type of physical or emotional reactions, in response to the character coming within proximity of a "tagged" element (such as a point of interest in a 3D world). The invention enables characters to appear much more realistic by giving the character a personality and appearing to bring the character to life in its virtual environment without having to script or animate each scene in advance.

BACKGROUND AND SUMMARY OF THE INVENTION

Many of us have seen films containing remarkably realistic dinosaurs, aliens, animated toys and other fanciful creatures. Such animations are made possible by computer graphics. Using such techniques, a computer graphics artist can specify how each object should look and how it should change in appearance over time, and a computer then models the objects and displays them on a display such as your television or a computer screen. The computer takes care of performing the many tasks required to make sure that each part of the displayed image is colored and shaped just right based on the position and orientation of each object in a scene, the direction in which light seems to strike each object, the surface texture of each object, and other factors.

Because computer graphics generation is complex, computer-generated three-dimensional graphics just a few years ago were mostly limited to expensive specialized flight simulators, high-end graphics workstations and supercomputers. The public saw some of the images generated by these computer systems in movies and expensive television advertisements, but most of us couldn't actually interact with the computers doing the graphics generation. All this has changed with the availability of relatively inexpensive 3D graphics platforms such as, for example, the NINTENDO 64®, the NINTENDO GAMECUBE® and various 3D graphics cards now available for personal computers. It is now possible to interact with exciting 3D animations and simulations on relatively inexpensive computer graphics systems in your home or office.

A problem graphics system designers have confronted is how to efficiently model and render realistic looking animations in real time or close to real time. To achieve more interesting dynamic animation, a number of video and computer games have used various animation techniques such as key frame transformations, inverse kinematics and the like to model and animate people, animals and other objects. See for example O'Rourke, *Principles of Three-Dimensional Computer Animation* (W. W. Norton 1998) at chapters 3 and 4 especially. While such techniques have been highly successful, animators have searched for ways to make animations more realistic without the need to control or map out each and every movement of an animated character beforehand.

One approach that has appeal is to make the animation engine responsible for making animated characters increasingly more intelligent. For example, it is possible to define an "intelligent" animated character within a three-dimensional environment and allow the character to react to the environment based on its programmed qualities. If the character is sufficiently intelligent, rather complex reactions can be dynamically created "on the fly" by the real time animation engine—saving the game developer the massive amount of time and effort that might otherwise be required to script out the animation sequence. See, for example, U.S. patent application Ser. No. 09/382,819 of Comair et al filed Aug. 25, 1999 entitled "Object Modeling For Computer Simulation And Animation" incorporated by reference herein.

While such approaches have been successful, further improvements are possible. In particular, we have developed a new, efficient technique for causing an animated character to pay attention to an object within a virtual world by tagging the object. When the animated character moves into proximity with an object (e.g., in response to user control), the system checks whether the object is tagged. If the object is tagged, the animation engine animates the character to pay attention to the tagged object (e.g., by animating the character to look or stare at the tagged object so long as the character remains close to the tagged object). The tag-based animation engine can, for example, animate the character to turn toward or face the tagged object in the process of paying attention to it—creating a very realistic visual effect without the typical programming overhead normally required to specify which direction the animated character should face and when. In other words, in accordance with the invention, the tags can be defined by designers at any location in the virtual world and given certain characteristics that are designed to cause a character that comes into a defined proximity of the tag to have some sort of reaction to the tag. By defining several tags in a scene, such as, for example, in a virtual hallway through which a character is walking, the animation engine makes the character much more realistic and to appear as if the character is coming to life through its reactions to the tags. The tags are preferably associated with virtual objects of the type that would typically cause a human to have a reaction in the real world. The tags are preferably defined to cause the same type of reaction in the character's animation, as a typical human would have in the same circumstance in the real world. In this way, the character has much more human-like reactions to its environment while moving through the virtual world, and the character can be made to appear as if it has "come to life."

In accordance with the invention, the tagging system of the animation engine is preferably priority based. In other words, each tag is assigned a priority value that is used by the animation engine to control which tag will be used when more than one tag is active. By prioritizing the tags in the environment, the animation engine as able to display the character as paying attention to or reacting to the tagged object that is of highest interest to the character, based on the character's current environment and/or state, from among several tags that may be in proximity to the character at any one time. This tag prioritization feature further helps to make the character appear more realistic by enabling the character to prioritize its reactions in the same or similar way to that of a human. For example, in the real world, humans typically are confronted with numerous objects (e.g., interesting painting, view, other object etc.) or events (loud noise, flashing light, movement, etc.) that may cause a reaction at any one time. However, humans, by their nature, typically react to the one thing that seems to be the most important at each instant in time. For instance, a human would typically stop looking at a piece of art when a loud noise comes from another object, and then quickly turn in the direction of the loud noise. Upon determining that the noise is not a problem, a human would then typically resume looking at the piece of art. These same human-like movements and reactions can be generated by the reactive animation system of the invention, by giving the object that makes the noise a higher priority tag while active as compared to the tag associated with the piece of art. In this way, all of the tagged objects in the environment can have relative priorities assigned thereto based on, for example, the nature of the object.

In one particular embodiment, the object can be tagged with a tag that inspires an emotion in the character while paying attention to the tagged object. The emotion can, for example, be fear, happiness, or any other discernible emotion. If an object is tagged to inspire fear, the character can be animated to turn toward the object and react with a look of horror. If an object is tagged to inspire happiness, the character can be animated to turn toward the object and react with a big smile. Other emotions and reactions are possible. In fact, the tag can be defined to cause any type of response that corresponds to any variable or role-playing element that the character may have, as well as to cause emotional and/or physical reactions. For example, the tag could modify the animation of the character so that the character appears injured, sick or insane while under the influence of an active tag.

In accordance with the invention, the character's animation is adapted to the tag when the tag is activated. Activation of the tag can occur when the user gets within a selected distance from the tag and/or based on some other defined event. The adaptation of the animation is preferably done by defining key frames for use in creating a dynamic animation sequence using the information provided by the tag. The dynamic animation sequence is preferably generated using the techniques known in the art as "Inbetweening" and "Inverse Kinematics." Inbetweening enables the frames between the key frames to be generated for the dynamic animation, and inverse kinematics is used to assure that the character's movements are natural during the animation. Once a tag is activated, the animation of the character is adapted from its generic or canned-animation to a dynamic animation based on the type of tag that has been encountered. Thus, the tag triggers a dynamic modification of the character's animation for the period of time it takes for the tag to become inactive, such as by the character moving out of range of the tag.

The dynamic animation provided by the reactive animation engine of the instant invention provides a character (or other object) with realistic reactions as the character moves through the virtual environment, without having to handcraft the animation for every possible scene in advance. Thus, the invention enables animation to be generated on-the-fly and in an unpredictable and realistic manner. As a result, the character's animation can constantly change in a variety of ways and depending on many possible variables. This makes the character's animation unpredictable and greatly enhances the visual effect of the display. A significant advantage of the instant invention is that the character can be displayed with a myriad of animations without having to script, hand-craft or store each of the animations in advance. Instead, the reactive animations are dynamically generated on-the-fly and in real time based on the tag.

BRIEF DESCRIPTION OF THE DRAWINGS

These and other features and advantages of the present invention may be better and more completely understood by referring to the following detailed description of presently preferred example embodiments in conjunction with the drawings, of which.

DETAILED DESCRIPTION OF PREFERRED EMBODIMENTS

FIGS. 1-5 show example screen effects provided by a preferred exemplary embodiment of this invention. These Figures show an animated character 10 moving through an illustrative video game environment such as a corridor of a large house or castle. Hanging on the wall 11 of the corridor is a 3D object 12 representing a painting. This object 12 is "tagged" electronically to indicate that character 10 should pay attention to it when the character is within a certain range of the painting. As the character 10 moves down the corridor (e.g., in response to user manipulation of a joystick or other interactive input device) (see FIG. 1) and into proximity to tagged object 12, the character's animation is dynamically adapted so that the character appears to be paying attention to the tagged object by, for example, facing the tagged object 12 (see FIG. 2). In the example embodiment, the character 10 continues to face and pay attention to the tagged object 10 while it remains in proximity to the tagged object (see FIG. 3). As the character moves out of proximity to the tagged object 12 (see FIG. 4), it ceases paying attention to the tagged object by ceasing to turn towards it. Once the animated character 10 is more than a predetermined virtual distance away from the tagged object 12, the character no longer pays attention to the object and the object no longer influences the character.

Figure 1:
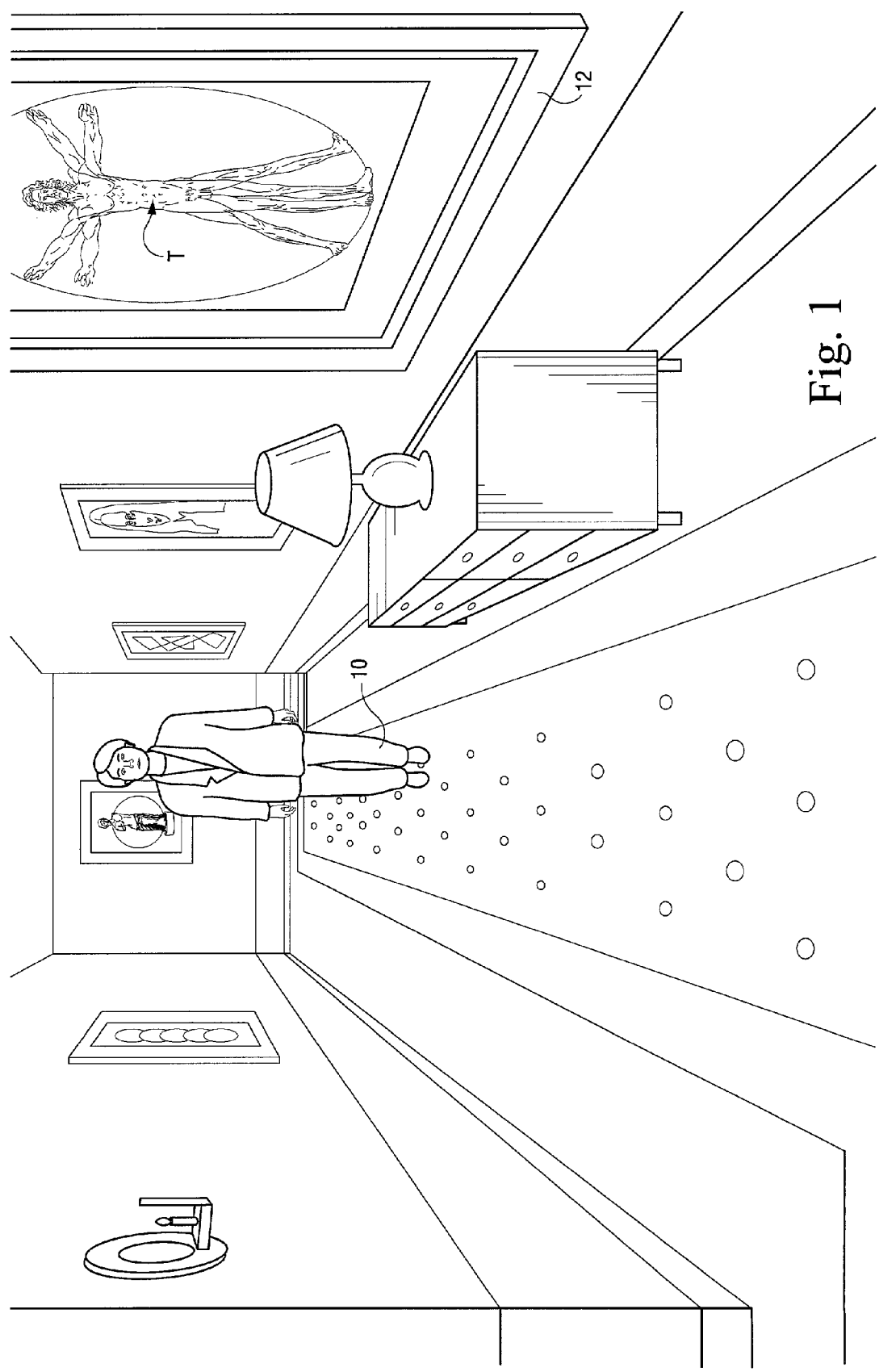
FIGS. 1-5 show example screen effects for a first exemplary animation sequence provided by a preferred embodiment of the invention.
Figure 2:
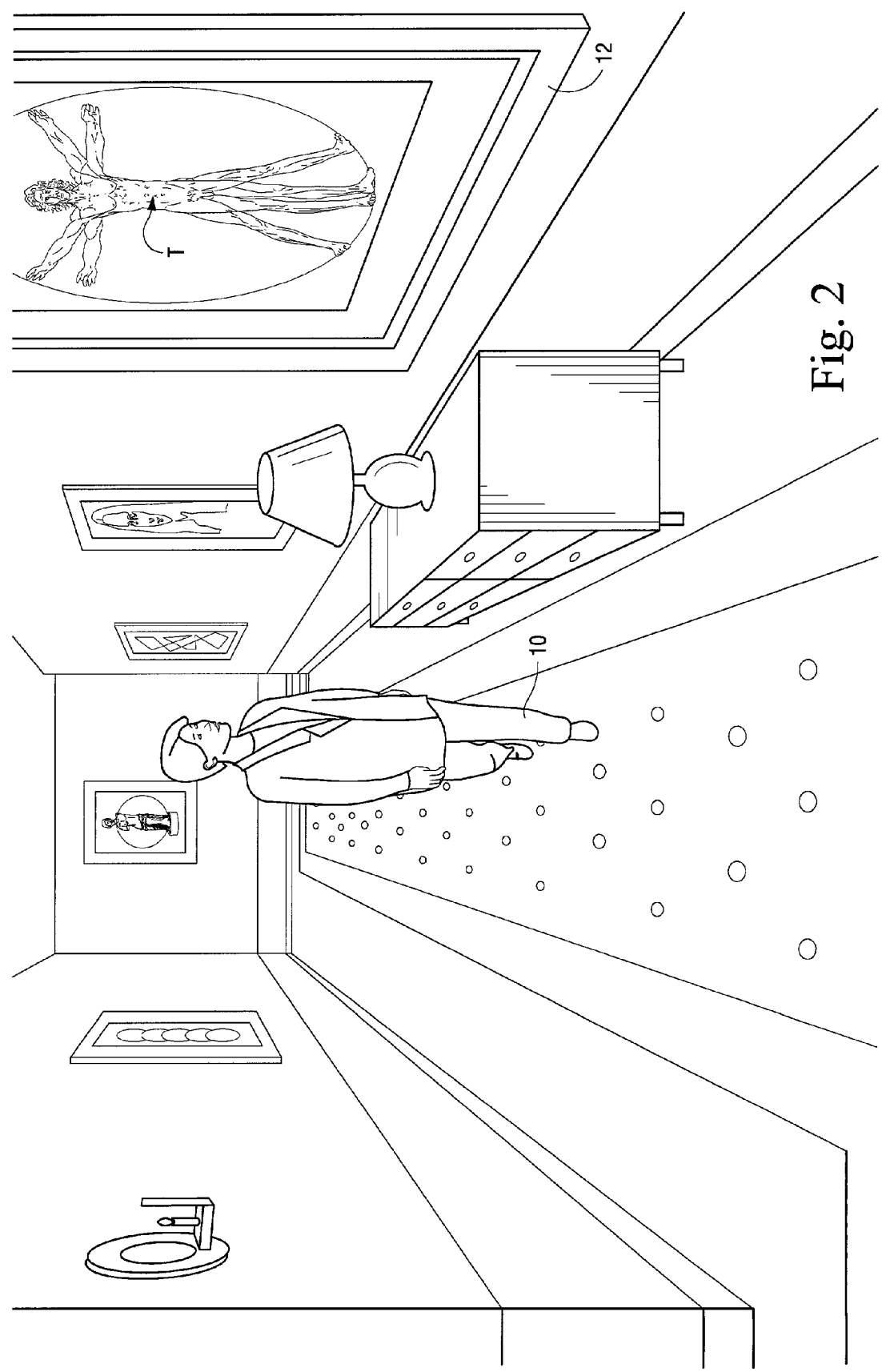
Figure 3:
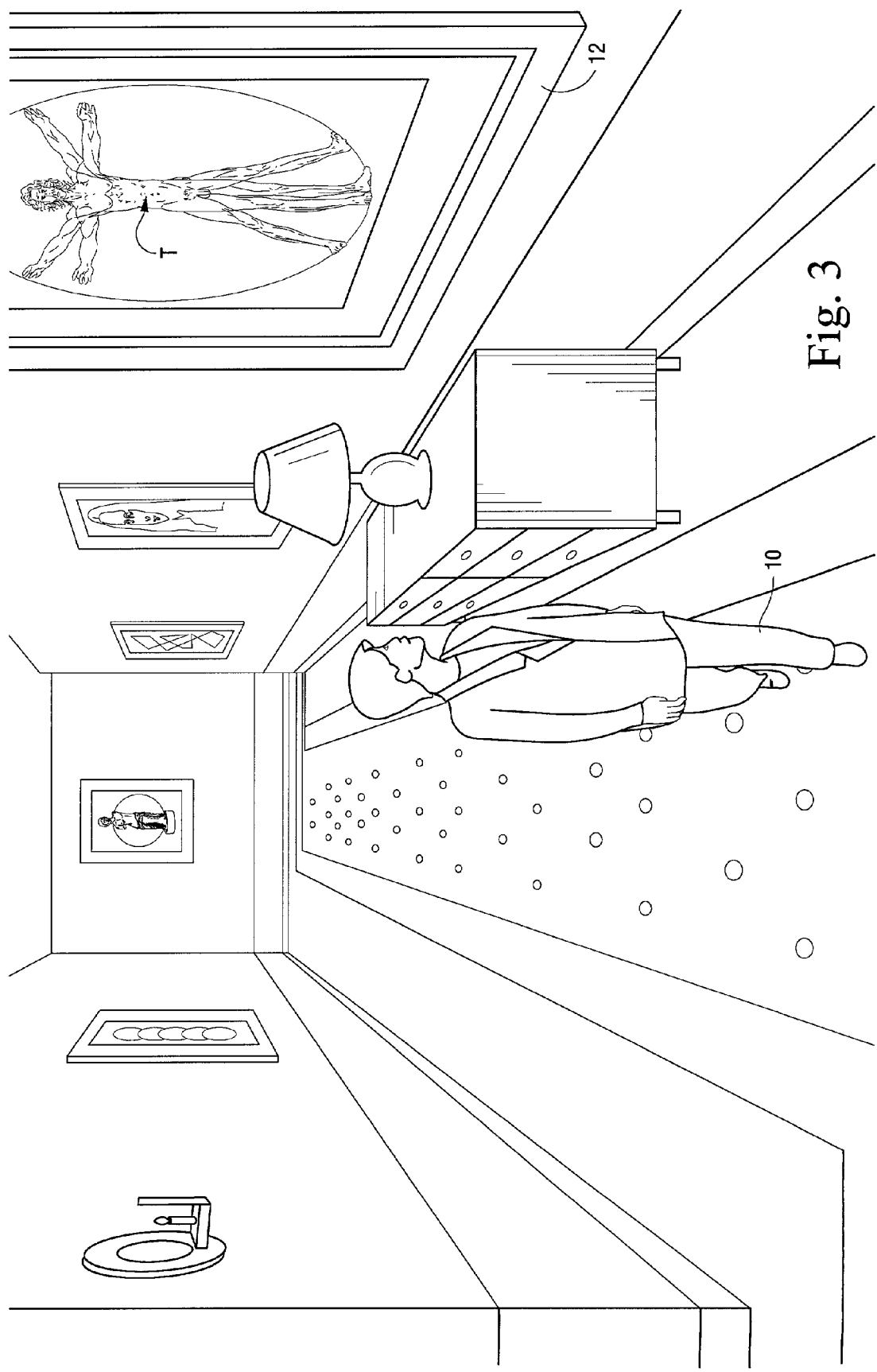
Figure 4:
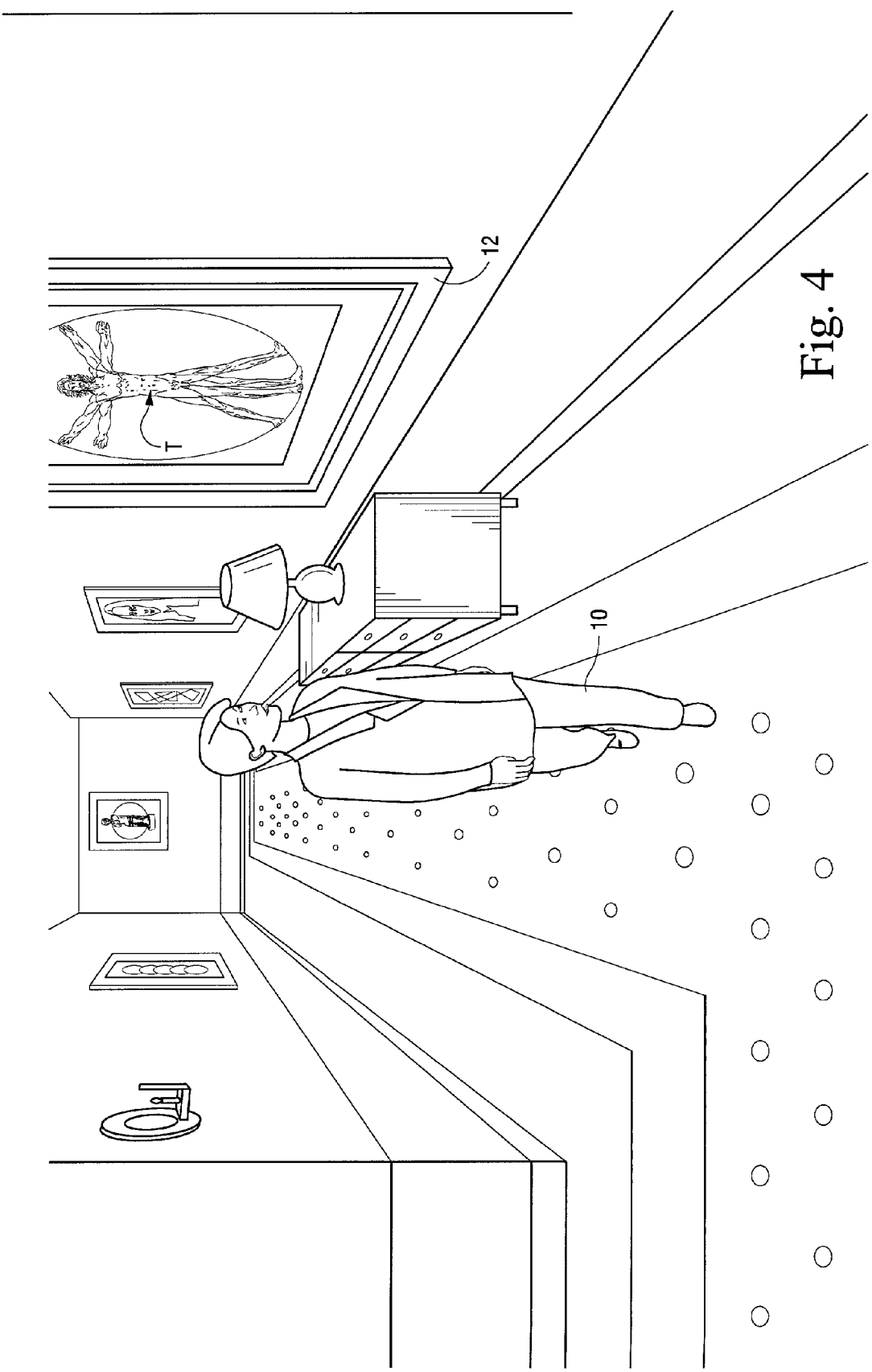

When the character first enters the corridor, as shown in FIG. 1, the character is animated using an existing or generic animation that simply shows the character walking. However, when the tag becomes active, i.e., the character approaches the painting 12, the reactive animation engine of the instant invention adapts or modifies the animation so that the character pays attention to the painting in a natural manner. The animation is preferably adapted from the existing animation by defining key frames and using the tag information (including the location and type of tag). More particularly, inbetweening and inverse kinematics are used to generate (i.e., calculate) a dynamic animation sequence for the character using the key frames and based on the tag. The dynamic animation sequence (rather than the existing or generic animation) is then displayed while the character is within proximity to the tag. However, when the tag is no longer active, the character's animation returns to the stored or canned animation (e.g., a scripted and stored animation that simply shows the character walking down the hallway and looking straight ahead).

In the screen effects shown in FIGS. 1-5, the object 12 is tagged with a command for character 10 to pay attention to the object but with no additional command eliciting emotion. Thus, FIGS. 1-5 show the character 10 paying attention to the tagged object 12 without any change of emotion. However, in accordance with the invention, it is also possible to tag object 12 with additional data or command(s) that cause character 10 to do something in addition to (or instead of) paying attention to the tagged object. In one illustrative example, the tagged object 12 elicits an emotion or other reaction (e.g., fear, happiness, belligerence, submission, etc.) In other illustrative examples, the tagged object can repel rather than attract character 10—causing the character to flee, for example. Any physical, emotional or combined reaction can be defined by the tag, such as facial expressions or posture change, as well as changes in any body part of the character (e.g., position of head, shoulders, feet, arms etc.).

Figure 5:
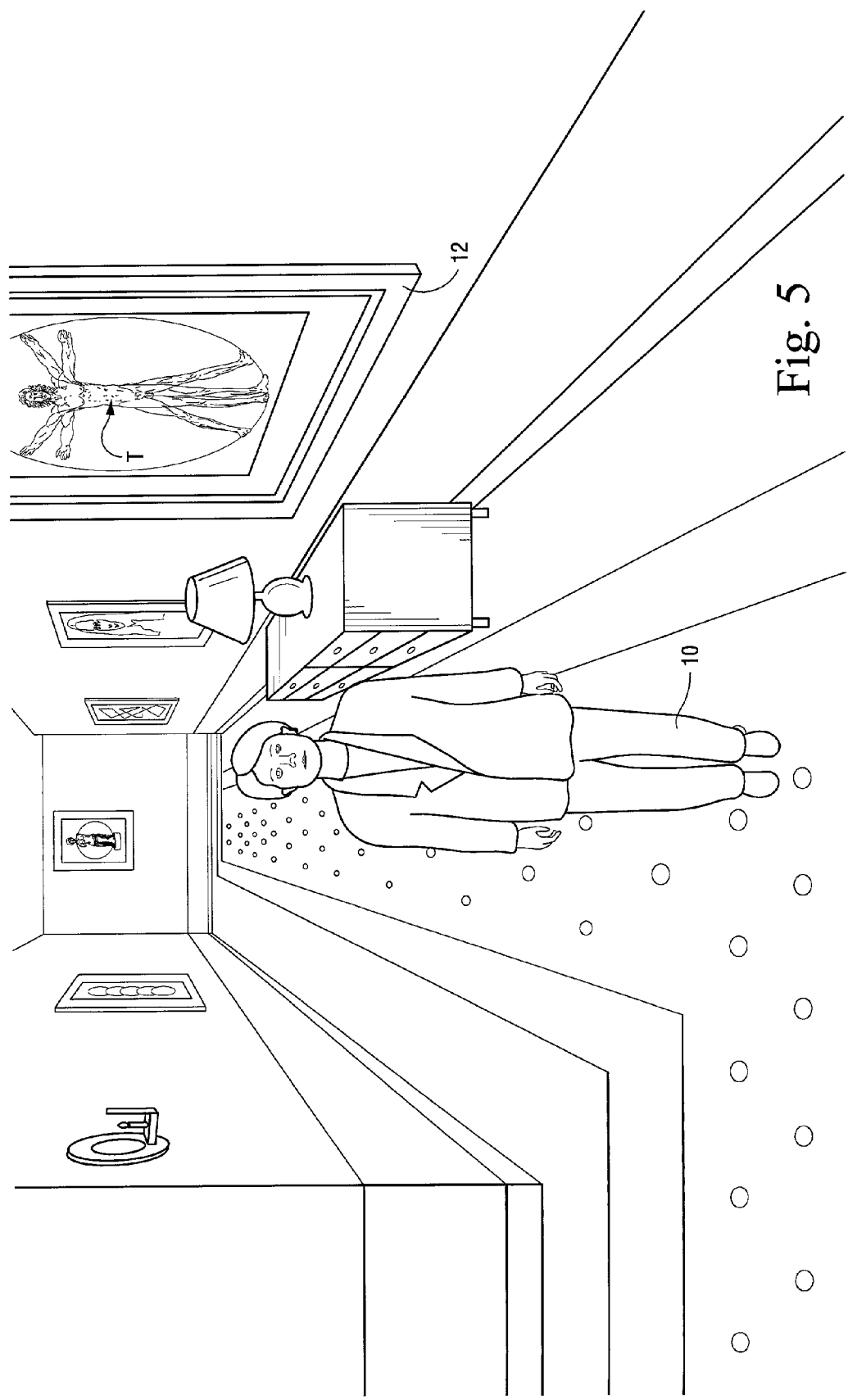
Figure 5A:
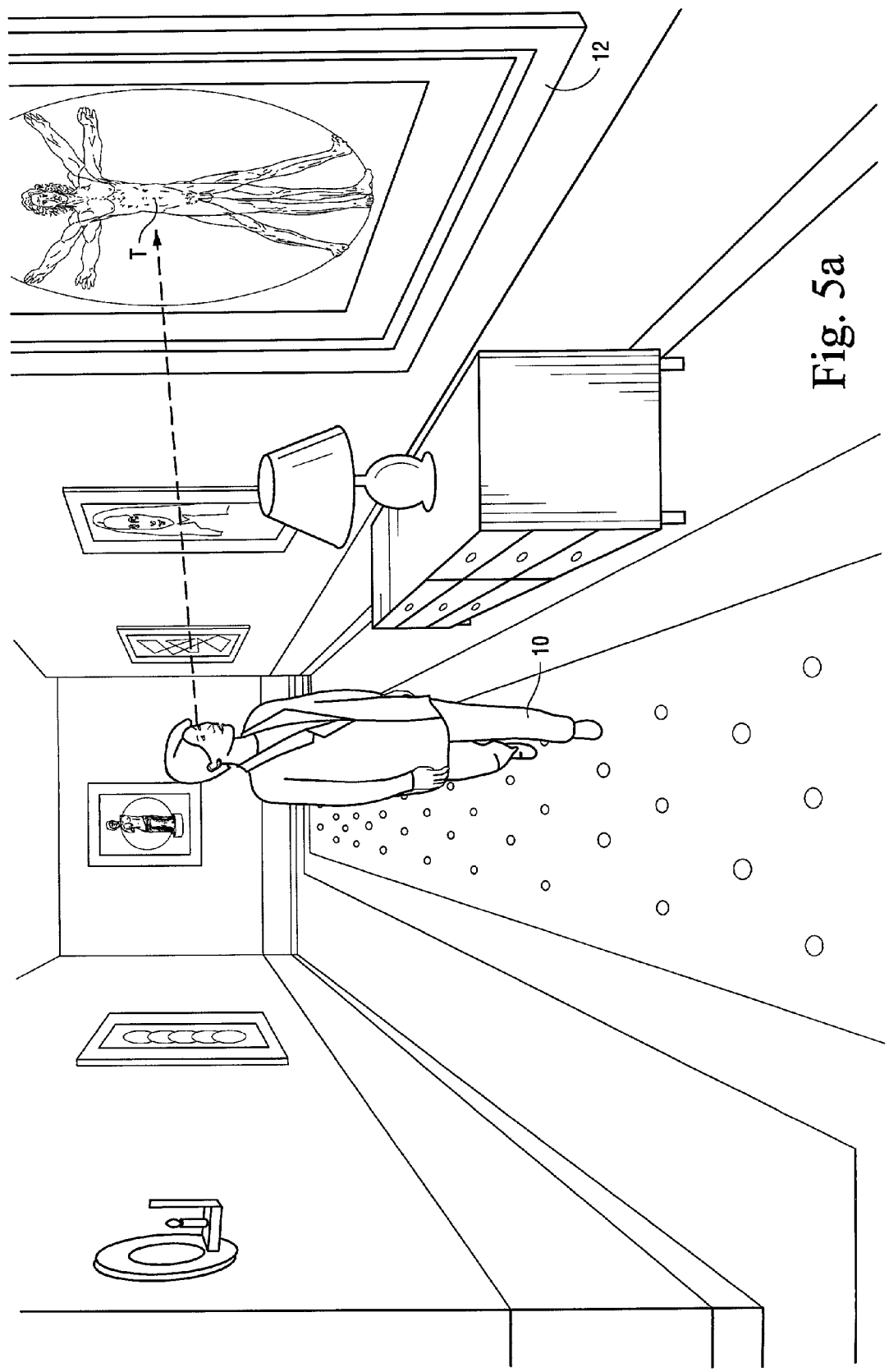
FIG. 5A shows an example conceptual display illustrating the location of a tag and a vector from the character's eyes to the tag.
Figure 6:
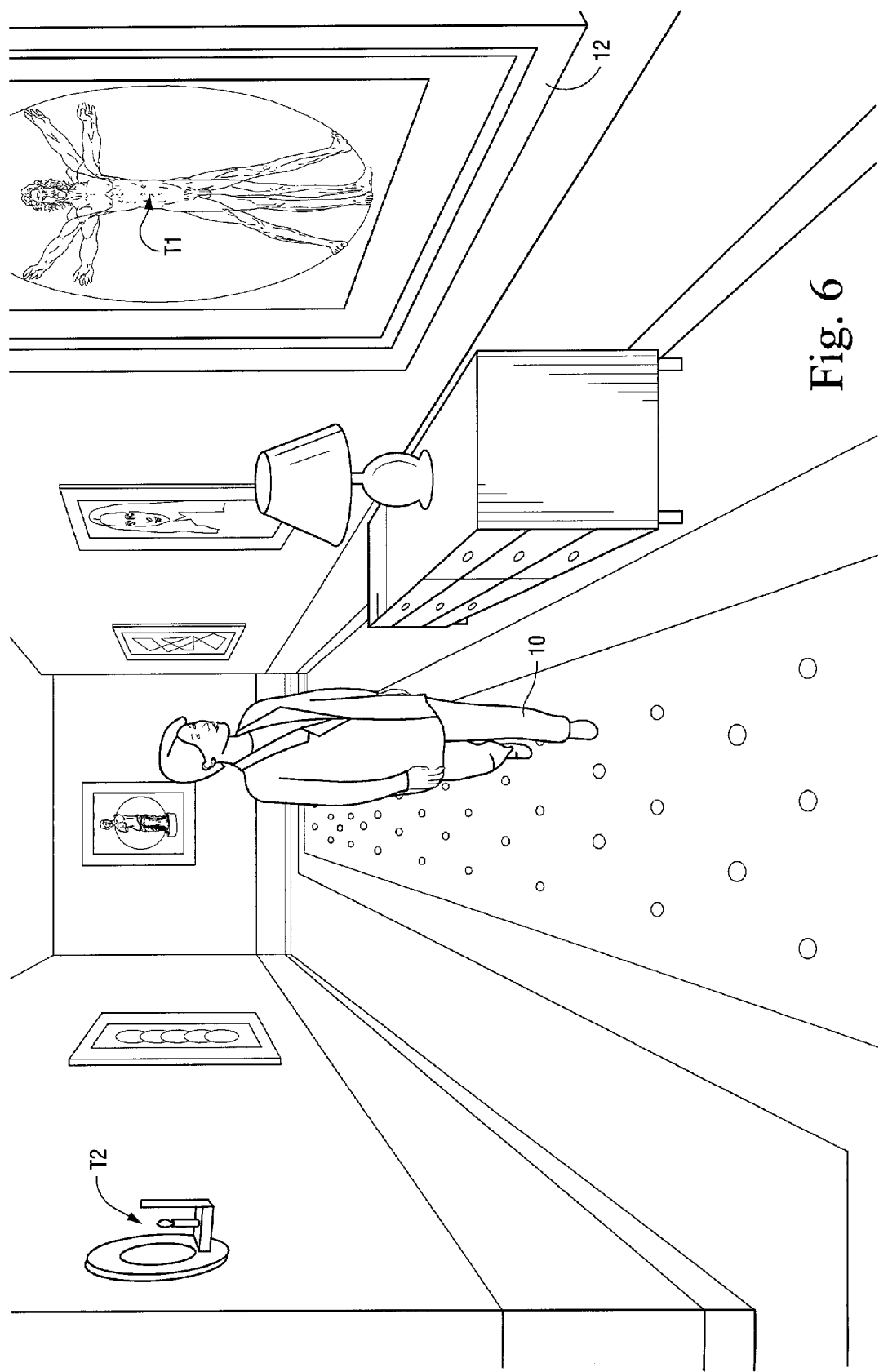
FIGS. 6, 7A, 7B, 8 and 9 show example screen effects for a second exemplary animation sequence by a preferred embodiment of the invention.
Figure 7A:
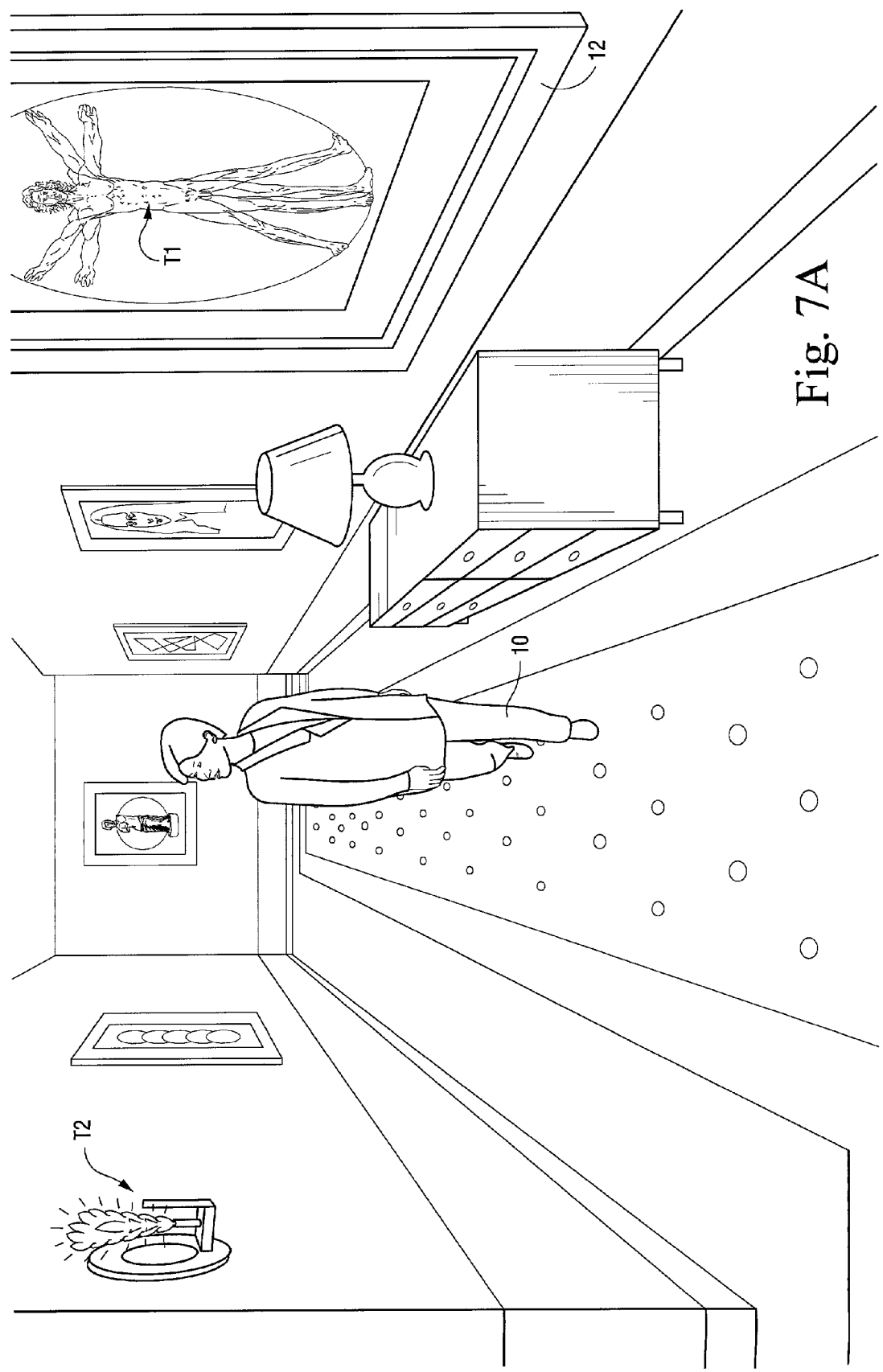
Figure 7B:
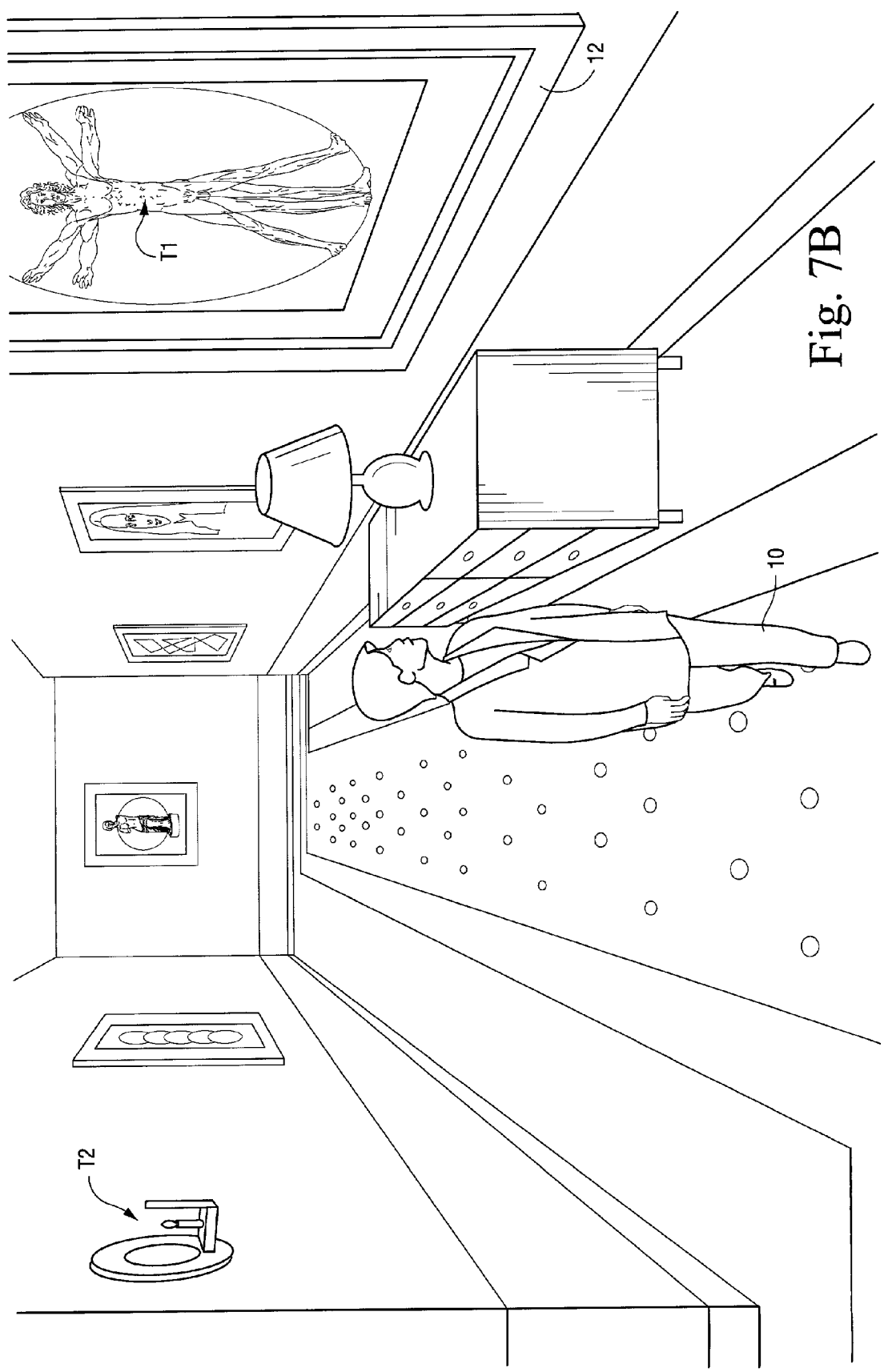
Figure 8:
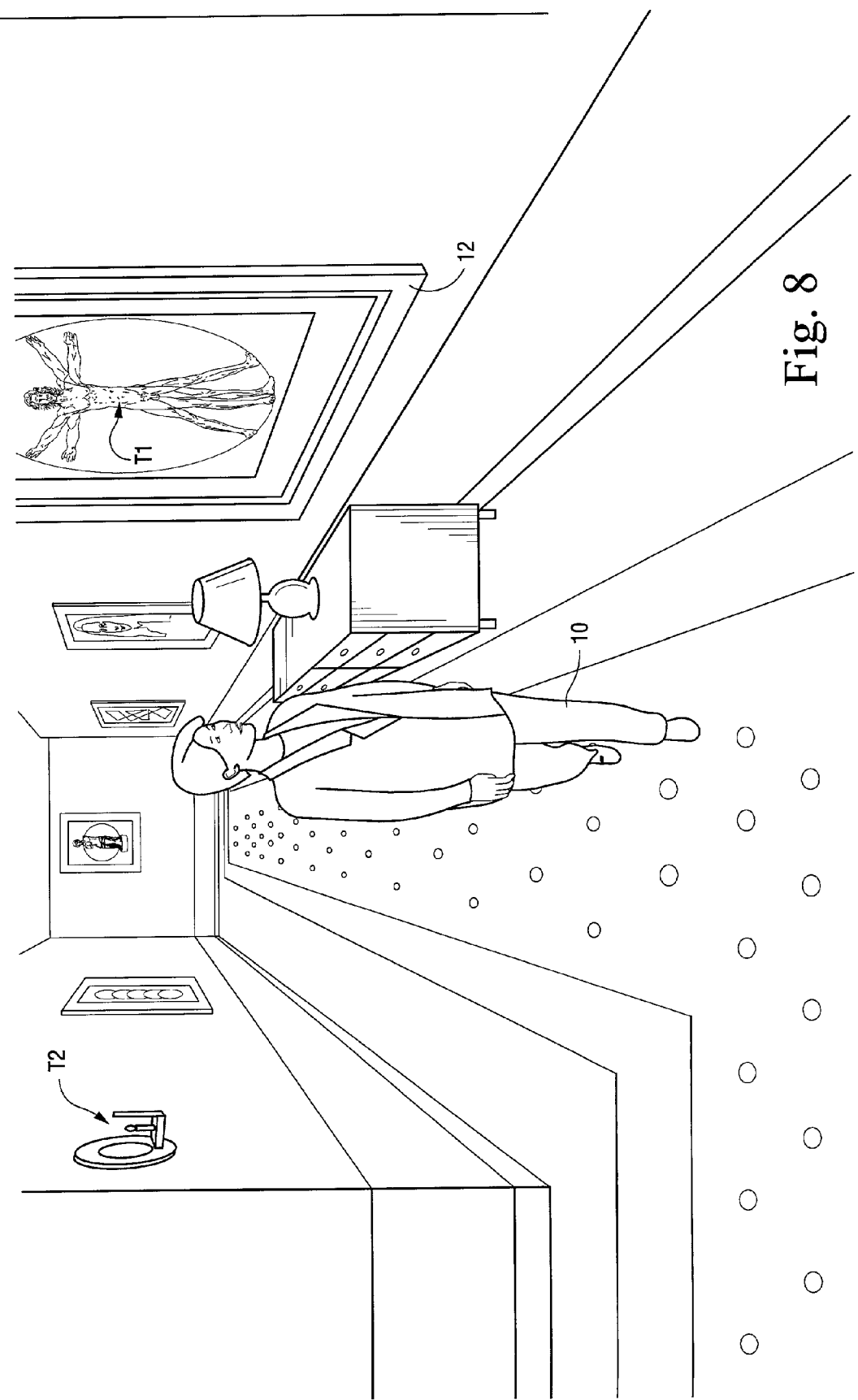
Figure 9:
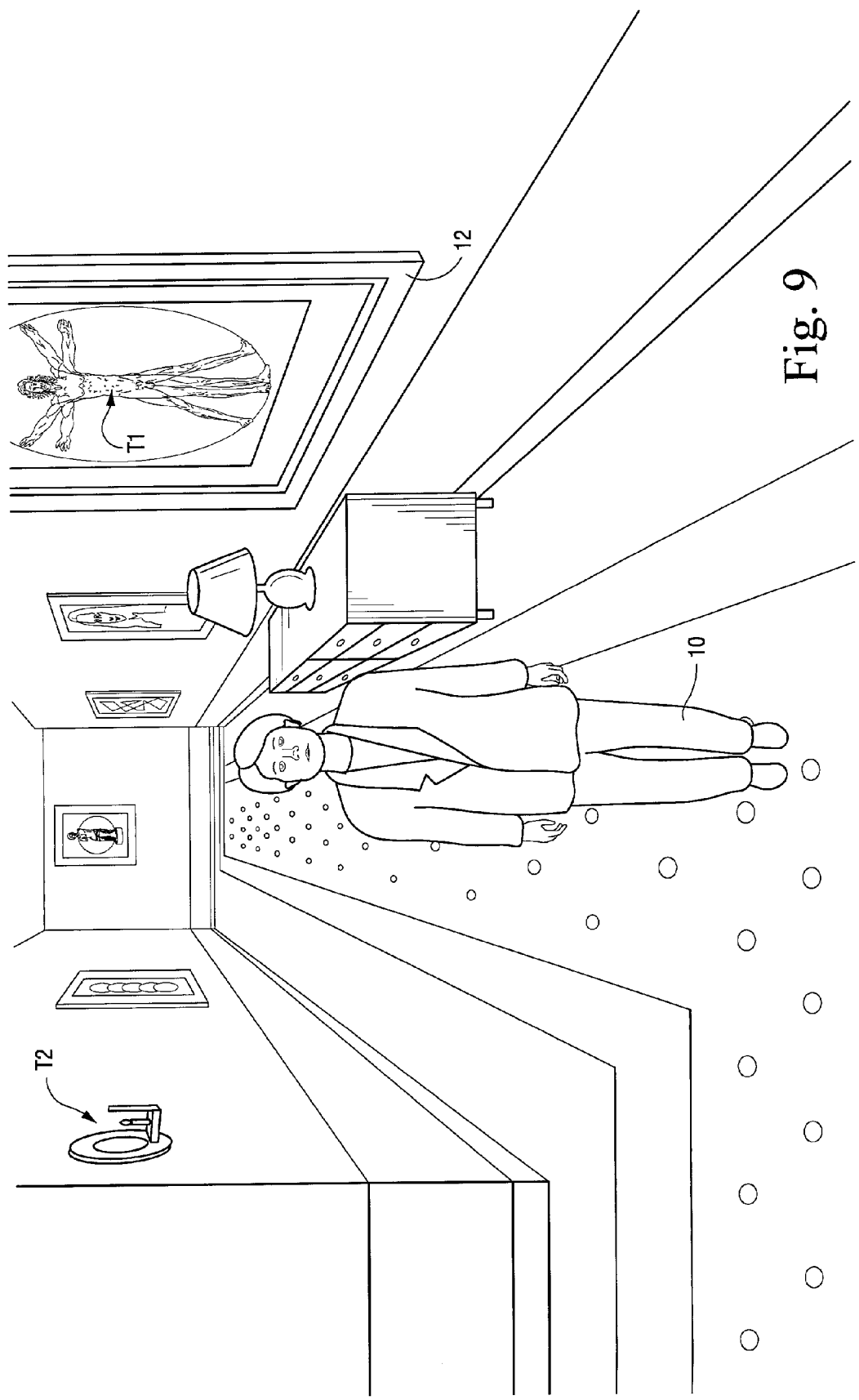

FIG. 5A is an example conceptual drawing showing the theory of operation of the preferred embodiment. Referring to FIG. 6, the "tag" T associated with an item in the 3D world is specified based on its coordinates in 3D space. Thus, to tag a particular object 12, one specifies the location of a "tag point" or "tag surface" in 3D space to coincide with the position of a desired object in 3D space. FIG. 5A shows a "tag" T (having a visible line from the character to the tag for illustration purposes) defined on the painting in the 3D virtual world. In accordance with the invention, the animated character 10 automatically responds by turning its head toward the "tag", thereby appearing to pay attention to the tagged object. The dotted line in FIG. 5A illustrates a vector from the center of the character 10 to the tag T. The animation engine can calculate this vector based on the relative positions of character 10 and tag T in 3D space and use the vector in connection with dynamically animating the character.

In accordance with a preferred embodiment of the invention, one can place any number of tags T at any number of locations within the 3D space. Any number of animated characters 10 (or any subsets of such characters, with different characters potentially being sensitive to different tags T) can react to the tags as they travel through the 3D world.

FIGS. 6-9 illustrate another embodiment of the invention, wherein two tags are defined in the corridor through which the character is walking. A first tag T1 is provided on the painting as described above in connection with the display sequence of FIGS. 1-5. However, in this embodiment, a second tag T2 is provided on the wall mounted candle. This second tag is different from the first tag in that it is defined to only cause a reaction from by the character when the candle is animated to flare up like a powerful torch (see FIG. 7A). The second tag T2 is given a higher priority than the first tag T1. The reactive animation engine is programmed to only allow the player to react to one tag at a time, that one tag being the tag that has the highest priority of any active tags. As a result, when the character 10 is walking down the corridor and gets within proximity of the two tags, the second tag is not yet active due to the fact that the candle is not flaring up. Thus, the character turns to the look at the only active tag T1 (i.e., the painting) (see FIG. 6). However, when the candle flares-up, the second tag T2, which has a higher priority than T1, also becomes active, thereby causing the character to stop looking at the painting and turn its attention to the flaring torch (i.e., the active tag with the highest priority) (see FIG. 7A). Once the torch stops flaring and returns to a normal candle, the second tag T2 is no longer active and the reactive animation engine then causes the character to again turn its attention to the painting (i.e. the only active tag)(see FIG. 7B). Once the character begins to move past the painting, the character's head then begins to turn naturally back (see FIG. 8) to the forward or uninterested position corresponding to the stored animation (see FIG. 9). Thus, in accordance with the invention, the character responds to active tags based their assigned priority. In this way, the character is made to look very realistic and appears as if it has come to life within its environment. As explained above, the reactive animation engine E dynamically generates the character's animation to make the character react in a priority-based manner to the various tags that are defined in the environment.

Example Illustrative Implementation

Figure 10A:
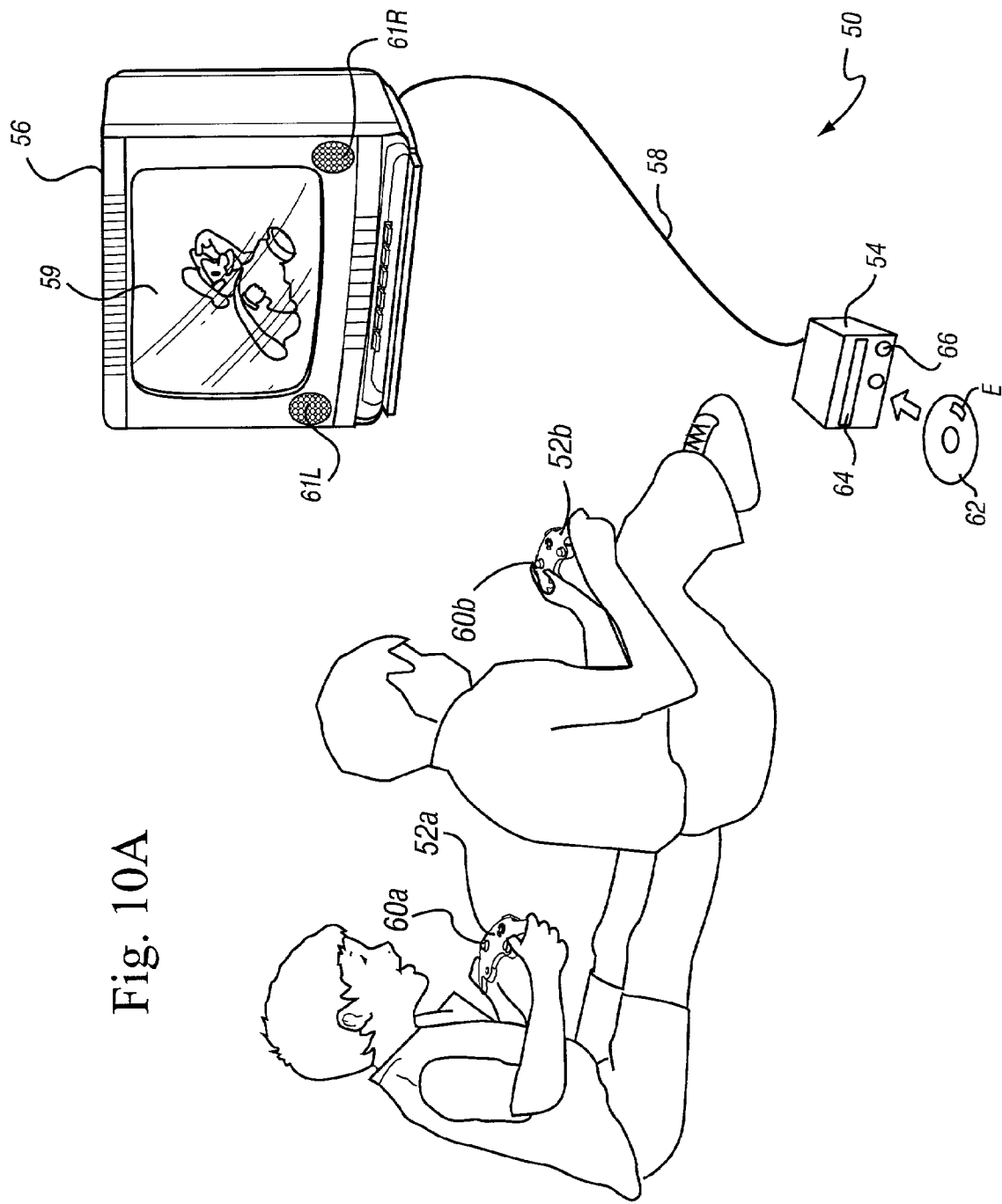
FIGS. 10A-10B illustrate an example system that may be used to create the displays of FIGS. 1-9.

FIG. 10A shows an example interactive 3D computer graphics system 50. System 50 can be used to play interactive 3D video games with interesting animation provided by a preferred embodiment of this invention. System 50 can also be used for a variety of other applications.

In this example, system 50 is capable of processing, interactively in real time, a digital representation or model of a three-dimensional world. System 50 can display some or the entire world from any arbitrary viewpoint. For example, system 50 can interactively change the viewpoint in response to real time inputs from handheld controllers 52a, 52b or other input devices. This allows the game player to see the world through the eyes of someone within or outside of the world. System 50 can be used for applications that do not require real time 3D interactive display (e.g., 2D display generation and/or non-interactive display), but the capability of displaying quality 3D images very quickly can be used to create very realistic and exciting game play or other graphical interactions.

To play a video game or other application using system 50, the user first connects a main unit 54 to his or her color television set 56 or other display device by connecting a cable 58 between the two. Main unit 54 produces both video signals and audio signals for controlling color television set 56. The video signals are what controls the images displayed on the television screen 59, and the audio signals are played back as sound through television stereo loudspeakers 61L, 61R.

The user also needs to connect main unit 54 to a power source. This power source may be a conventional AC adapter (not shown) that plugs into a standard home electrical wall socket and converts the house current into a lower DC voltage signal suitable for powering the main unit 54. Batteries could be used in other implementations.

The user may use hand controllers 52a, 52b to control main unit 54. Controls 60 can be used, for example, to specify the direction (up or down, left or right, closer or further away) that a character displayed on television 56 should move within a 3D world. Controls 60 also provide input for other applications (e.g., menu selection, pointer/cursor control, etc.). Controllers 52 can take a variety of forms. In this example, controllers 52 shown each include controls 60 such as joysticks, push buttons and/or directional switches. Controllers 52 may be connected to main unit 54 by cables or wirelessly via electromagnetic (e.g., radio or infrared) waves.

To play an application such as a game, the user selects an appropriate storage medium 62 storing the video game or other application he or she wants to play, and inserts that storage medium into a slot 64 in main unit 54. Storage medium 62 may, for example, be a specially encoded and/or encrypted optical and/or magnetic disk. The user may operate a power switch 66 to turn on main unit 54 and cause the main unit to begin running the video game or other application based on the software stored in the storage medium 62. The user may operate controllers 52 to provide inputs to main unit 54. For example, operating a control 60 may cause the game or other application to start. Moving other controls 60 can cause animated characters to move in different directions or change the user's point of view in a 3D world. Depending upon the particular software stored within the storage medium 62, the various controls 60 on the controller 52 can perform different functions at different times.

As also shown in FIG. 10A, mass storage device 62 stores, among other things, a tag-based animation engine E used to animate characters based on tags stored in the character's video game environment. The details of preferred embodiment tag-based animation engine E will be described shortly. Such tag-based animation engine E in the preferred embodiment makes use of various components of system 50 shown in FIG. 10B including:

a main processor (CPU) 110,
a main memory 112, and
a graphics and audio processor 114.

In this example, main processor 110 (e.g., an enhanced IBM Power PC 750) receives inputs from handheld controllers 52 (and/or other input devices) via graphics and audio processor 114. Main processor 110 interactively responds to user inputs, and executes a video game or other program supplied, for example, by external storage media 62 via a mass storage access device 106 such as an optical disk drive. As one example, in the context of video game play, main processor 110 can perform collision detection and animation processing in addition to a variety of interactive and control functions.

In this example, main processor 110 generates 3D graphics and audio commands and sends them to graphics and audio processor 114. The graphics and audio processor 114 processes these commands to generate interesting visual images on display 59 and interesting stereo sound on stereo loudspeakers 61R, 61L or other suitable sound-generating devices. Main processor 110 and graphics and audio processor 114 also perform functions to support and implement the preferred embodiment tag-based animation engine E based on instructions and data E' relating to the engine that is stored in DRAM main memory 112 and mass storage device 62.

Figure 10B:
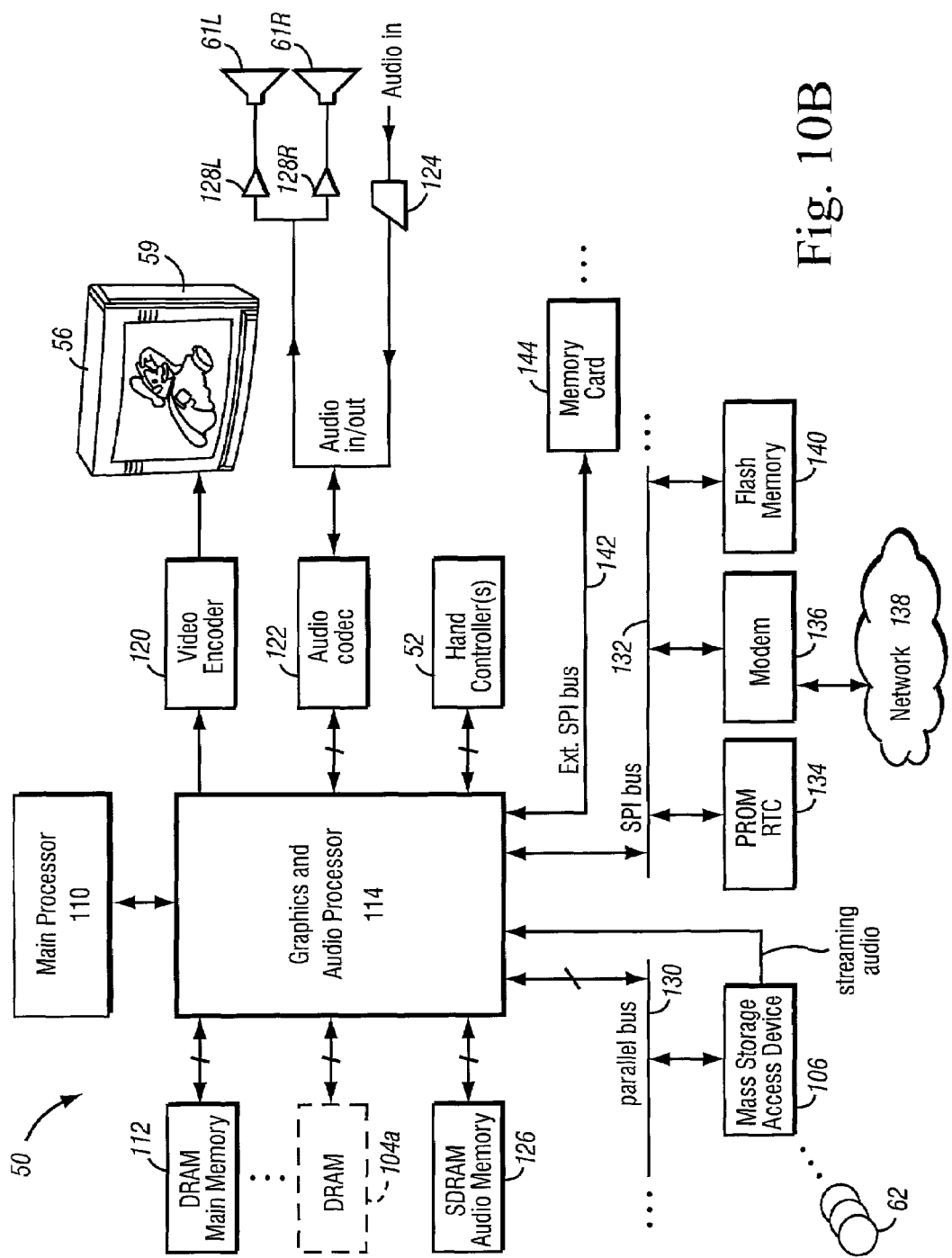

As further shown in FIG. 10B, example system 50 includes a video encoder 120 that receives image signals from graphics and audio processor 114 and converts the image signals into analog and/or digital video signals suitable for display on a standard display device such as a computer monitor or home color television set 56. System 50 also includes an audio codec (compressor/decompressor) 122 that compresses and decompresses digitized audio signals and may also convert between digital and analog audio signaling formats as needed. Audio codec 122 can receive audio inputs via a buffer 124 and provide them to graphics and audio processor 114 for processing (e.g., mixing with other audio signals the processor generates and/or receives via a streaming audio output of mass storage access device 106). Graphics and audio processor 114 in this example can store audio related information in an audio memory 126 that is available for audio tasks. Graphics and audio processor 114 provides the resulting audio output signals to audio codec 122 for decompression and conversion to analog signals (e.g., via buffer amplifiers 128L, 128R) so they can be reproduced by loudspeakers 61L, 61R.

Graphics and audio processor 114 has the ability to communicate with various additional devices that may be present within system 50. For example, a parallel digital bus 130 may be used to communicate with mass storage access device 106 and/or other components. A serial peripheral bus 132 may communicate with a variety of peripheral or other devices including, for example:

a programmable read-only memory and/or real time clock 134,
a modem 136 or other networking interface (which may in turn connect system 50 to a telecommunications network 138 such as the Internet or other digital network from/to which program instructions and/or data can be downloaded or uploaded), and
flash memory 140.

A further external serial bus 142 may be used to communicate with additional expansion memory 144 (e.g., a memory card) or other devices. Connectors may be used to connect various devices to busses 130, 132, 142. For further details relating to system 50, see for example U.S. patent application Ser. No. 09/723,335 filed Nov. 28, 2000 entitled "EXTERNAL INTERFACES FOR A 3D GRAPHICS SYSTEM" incorporated by reference herein.

Figure 11:
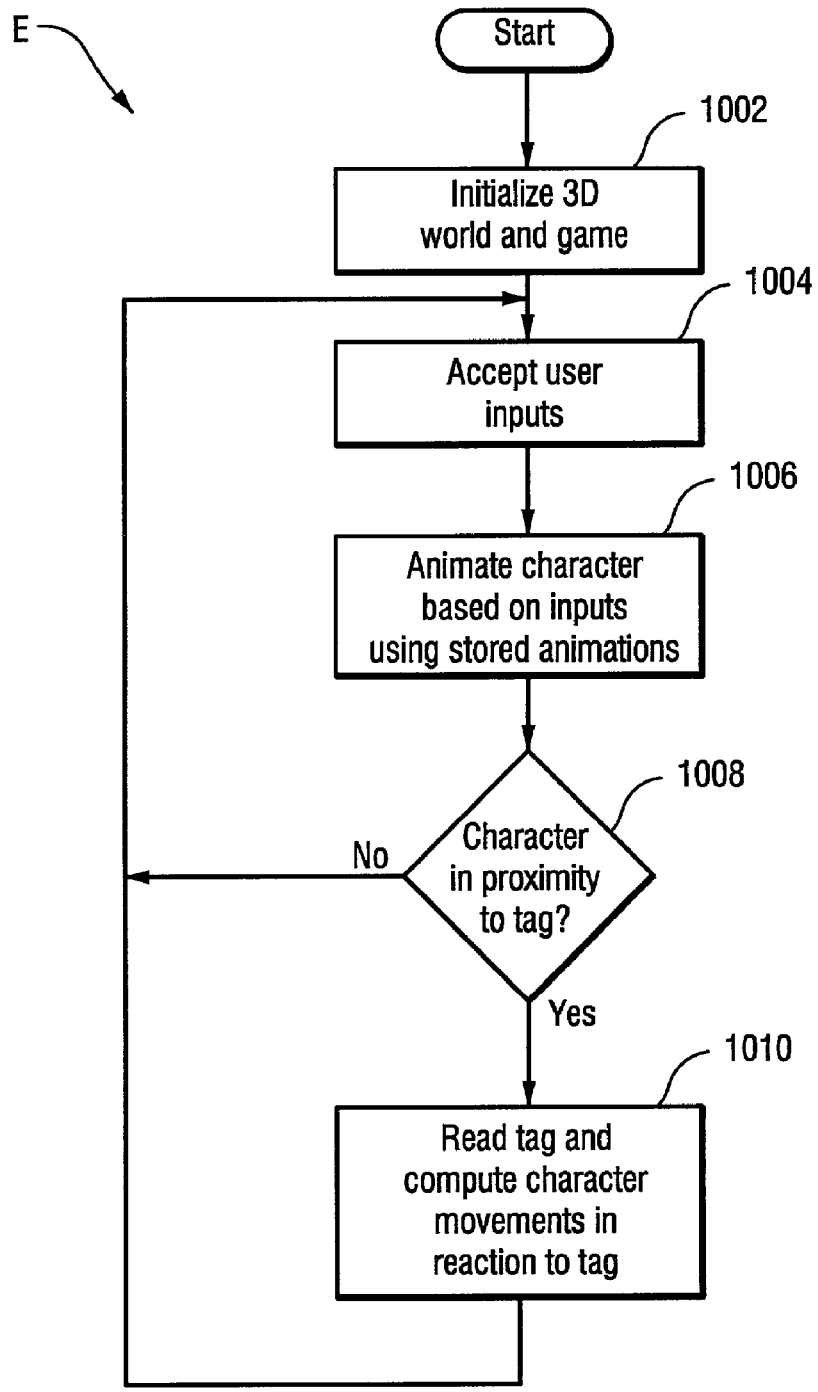
FIG. 11 is an example flowchart of steps performed by a tag-based animation engine of the instant invention.

FIG. 11 shows an example simplified illustration of a flowchart of the tag-based animation engine E of the instant invention. Animation engine E may be implemented for example by software executing on main processor 110. Tag-based animation engine E may first initialize a 3D world and animation game play (block 1002), and may then accept user inputs supplied for example via handheld controller(s) 52 (block 1004). In response to such user inputs, engine E may animate one or more animated characters 10 in a conventional fashion to cause such characters to move through the 3D world based on the accepted user inputs (block 1006). Tag-based animation engine E also detects whether any moving character is in proximity to a tag T defined within the 3D world (decision block 1008). If a character 10 is in proximity to a tag T, the animation engine E reads the tag and computes (e.g., through mathematical computation and associated modeling, such as by using inbetweening and inverse kinematics) a dynamic animation sequence for the character 10 to make the character realistically turn toward or otherwise react to the tag (block 1010). Processing continues (blocks 1004-1010) until the game is stopped or some other event causes an interruption.

Figure 12:
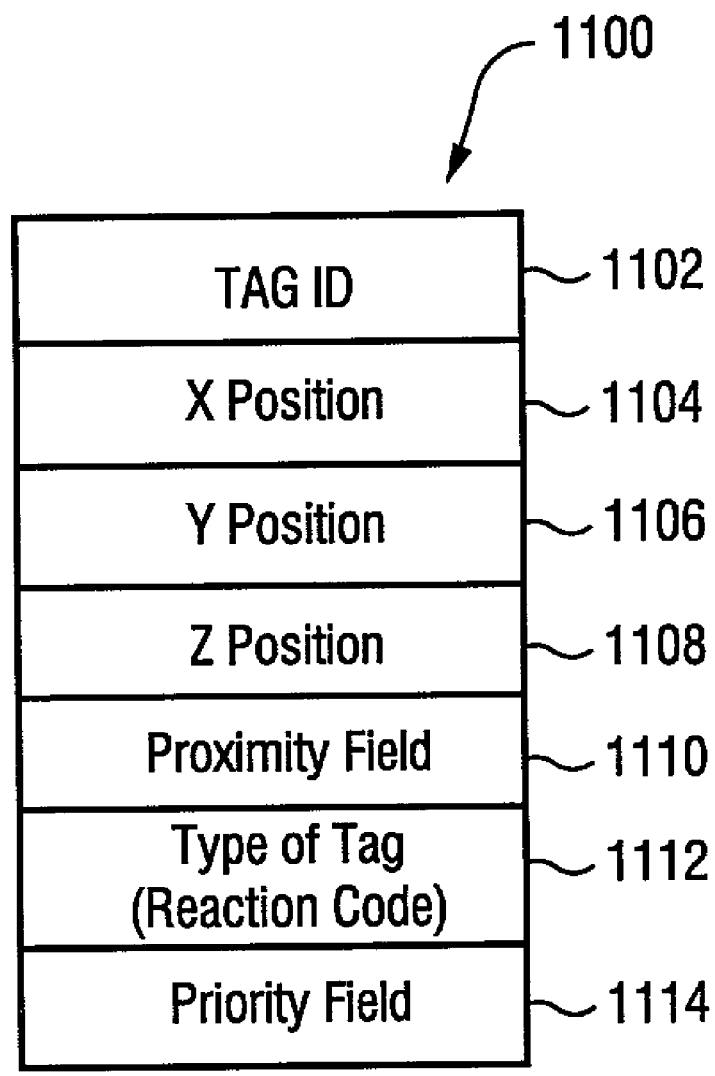
FIG. 12 illustrates an example tag data structure for tags used in accordance with the instant invention.

FIG. 12 shows an illustrative exemplary data structure 1100 for a tag T. In the example shown, data structure 1100 includes a tag ID field 1102 that identifies the tag; three-dimensional (i.e., X, Y, Z) positional coordinate fields 1104, 1106, 1108 (plus further optional additional information if necessary) specifying the position of the tag in the 3D world; a proximity field 1110 (if desired) specifying how close character 10 must be to the tag in order to react to the tag; a type of tag or reaction code 1112 specifying the type of reaction to be elicited (e.g., pay attention to the tag, flee from the tag, react with a particular emotion, etc.); and a priority field 114 that defined a priority for the tag relative to other tags that may be activated at the same time as the tag.

Figure 13:
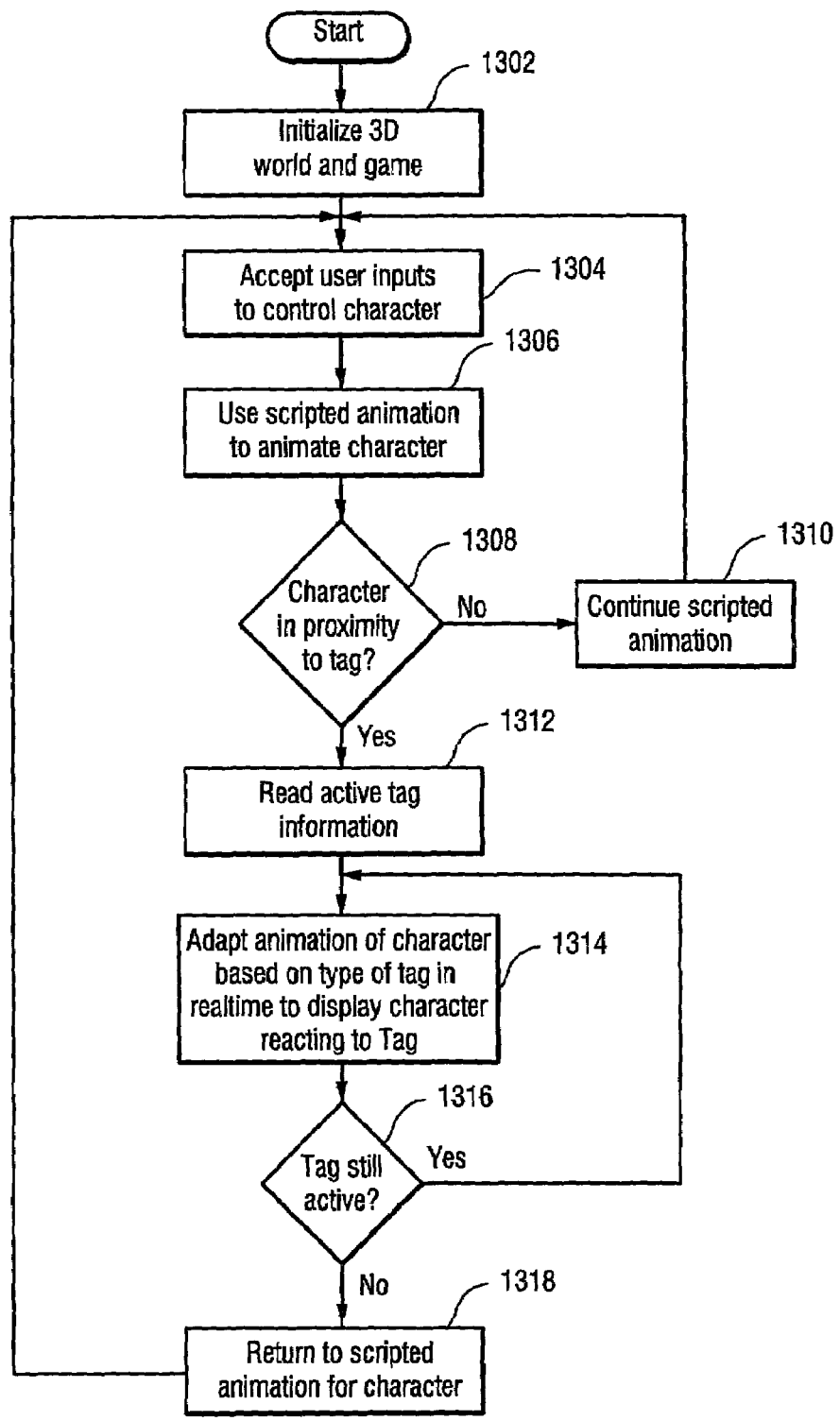
FIG. 13 is a more detailed example flow chart of steps performed by the tag-based animation engine of the instant invention.

FIG. 13 shows a more detailed exemplary flow chart of the steps performed by the reactive animation engine E of the instant invention. Once the 3D world and game play are initialized (step 1302), the system accepts user inputs to control the character within the environment in a conventional manner (step 1304). The system initially uses scripted or canned animation that is provided with the game for the character (step 1306). The animation engine checks the characters position relative to the tags that have been defined in the 3D world by the designers of the game (step 1308). If the character is not within proximity to tag then the standard animation continues for the character (step 1310). However, when a tag is detected (step 1308), the tag is read to determine the type of reaction that the tag is supposed to elicit from the character and the exact location of the tag in the 3D world (step 1312). The animation engine E then uses key frames (some or all of which may come from the scripted animation) and the tag information to dynamically adapt or alter the animation of the character to the particular tag encountered (step 1314). The dynamic animation is preferably generated using a combination of inbetweening and inverse kinematics to provide a smooth and realistic animation showing a reaction to the tag. Particular facial animations may also be used to give the character facial emotions or reactions to the tag. These facial animations can be selected from a defined pool of facial animations, and inbetweening or other suitable animation techniques can be used to further modify or dynamically change the facial expressions of the character in response to the tag. The dynamic animation then continues until the tag is no longer active (step 1316), as a result of, for example, the character moving out of range of the tag. Once the dynamic animation is completed, the standard or scripted animation is then used for the character until another tag is activated (step 1318).

Figure 14:
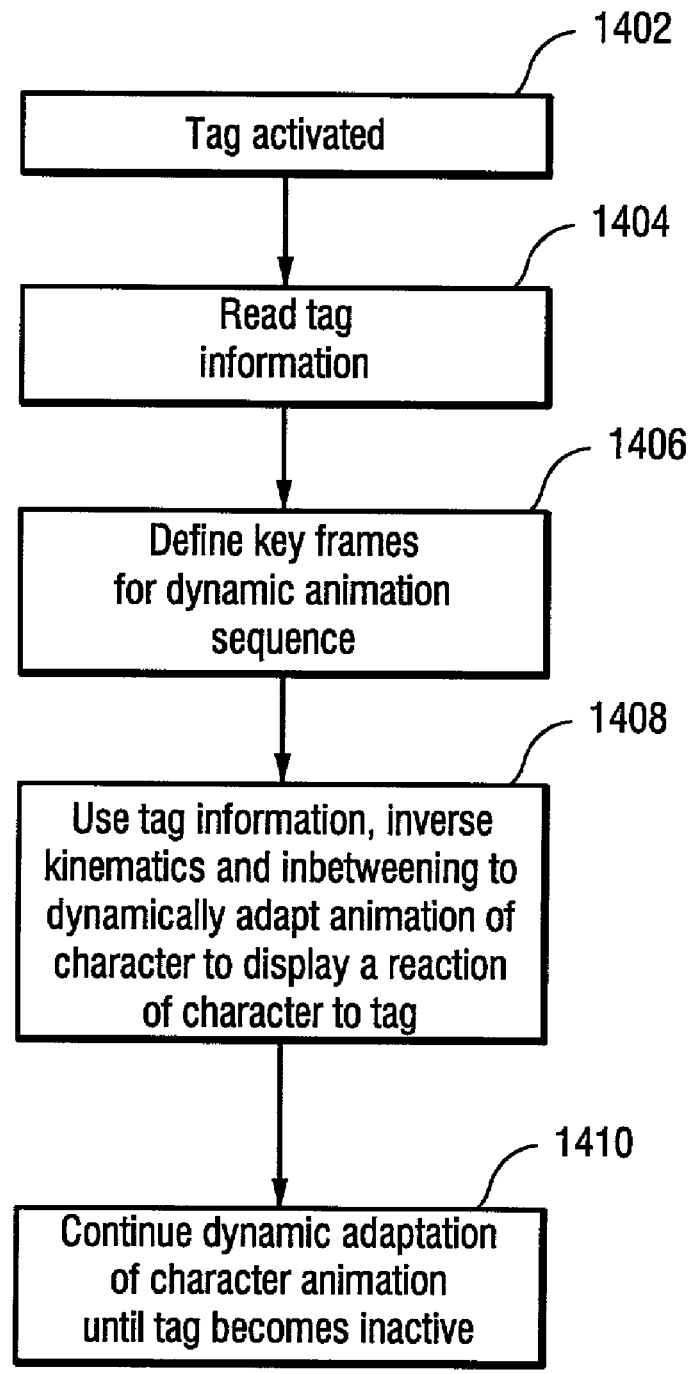
FIG. 14 is an exemplary flow chart of the steps performed by the tag-based animation engine of the instant invention in order to generate a dynamic animation sequence.

FIG. 14 shows a simplified flow chart of the steps performed by the reactive animation engine E of the instant invention in order to generate the dynamic animation sequence in response to an activated tag. As seen in FIG. 14, once a tag is activated (step 1402), the animation engine reads the tag to determine the type of tag, its exact location and any other information that is associated with the tag (step 1404). The engine then defines key frames for use in generating the dynamic animation (step 1406). The key frames and tag information are then used, together with inbetweening and inverse kinematics, to create an animation sequence for the character on-the-fly (step 1408). Preferably, the dynamic animation sequence is adapted from the standard animation, so that only part of the animation needs to be modified, thereby reducing the overall work that must be done to provide the dynamic animation. In other words, the dynamic animation is preferably generated as an adaptation or alteration of the stored or standard animation. The dynamic animation then continues until the tag is no longer active (step 1410), at which time the characters animation returns to the standard animation.

Figure 15:
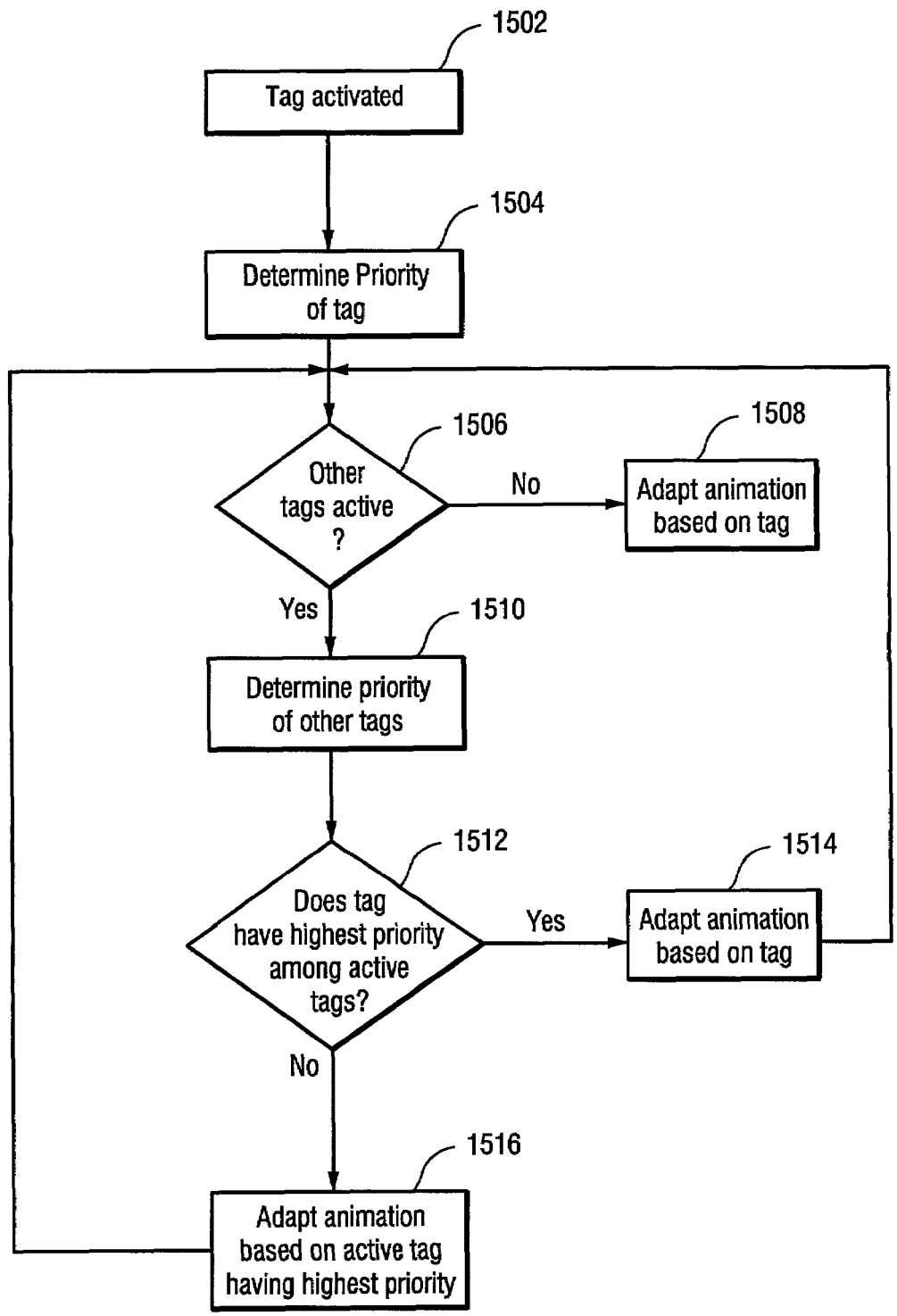
FIG. 15 is an exemplary flow chart of the steps performed by the tag-based animation engine for tag priority management.

FIG. 15 shows an exemplary flow chart of the priority-based tagging feature of the instant invention. This feature enables several or many tags to be activated simultaneously while still having the character react in a realistic and in a priority based manner. As seen in FIG. 15, when a tag is activated, the animation engine determines the priority of the tag (step 1502), as well as doing the other things described above. The animation engine then determines if any other tags are currently active (step 1506). If no other tags are active, the animation engine dynamically adapts or alters the animation, in the manner described above, to correspond to the active tag (step 1508). If, on the other hand, one or more other tags are currently active, the reactive animation engine determines the priority of each of the other active tags (step 1510) to determine if the current tag has a higher priority relative to each of the other currently active tags (step 1512). If the current tag does have the highest priority, then the animation engine dynamically generates the character's animation based on the current tag (step 1514). If, on the other hand, another active tag has a higher priority than the currently active tag, then the animation engine E adapts the animation in accordance with the other tag having the highest priority (step 1516). When the other tag having a higher priority is no longer active, but the original tag (i.e., from step 1502) is still active, then the animation engine dynamically generates the character's animation based on the original tag as soon as the higher priority tag has become inactive. In this way, the character's attention can be smoothly and realistically changed from one tagged object to another tagged object, as well as from no tagged object to a tagged object. FIGS. 6-9 illustrate an exemplary priority-based display sequence as just described.

As can be seen from the description above, the instant reactive animation engine E of the instant invention can be used in a variety of video games and/or other graphical applications to improve realism and game play. The invention enables a character to appear as if it has "come to life" in the game environment. The instant invention is particularly advantageous when incorporated into role playing games wherein a character interacts with a 3D world and encounters a variety of objects and/or other characters that can have certain effects on a character. The animation engine of the instant invention can also be implemented such that the same tag has a different effect on the character depending on the state of a variable of the character at the time the tagged object is encountered. One such variable could be the "sanity" level of the player in a sanity-based game, such as described in U.S. provisional application serial No. 60/184,656 filed Feb. 24, 2000 and entitled "Sanity System for Video Game", the disclosure of which is incorporated by reference herein. In other words, a tag may be defined such that it does not cause much of a reaction from the character when the character has a high sanity level. On the other hand, the same tag may cause a drastic reaction from the character (such as eye's bulging) when the character is going insane, i.e., when having a low sanity level. Any other variable or role playing element, such as health or strength, could also be used to control the type of reaction that a particular tag has on the particular character at any given time during the game. Other characters, such as monsters, can also be tagged and with prioritized tags as described above in order to cause the character to react to other characters as well as other objects. Tags can also be defined such that factors other than proximity (such as timing, as in the candle/torch example above) can be used alone or in addition to proximity to cause activation of the tag.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of animating a user-controlled character in a virtual three-dimensional environment of a dynamic three-dimensional game space, comprising:

rendering the three-dimensional environment of the three-dimensional game space in which the user-controlled character will be animated;

defining a tag at a location in the three-dimensional virtual environment that is external to the user-controlled character, and assigning tag information to the tag that designates a type of reaction for the user-controlled character and a type of reaction for an object associated with the tag when the user-controlled character comes in proximity to the tag;

animating the user-controlled character using a scripted animation sequence in response to user inputs;

detecting when the user-controlled character is within a predetermined proximity to the tag; and, when the user-controlled character is within a predetermined proximity to the tag, using the location of the tag and the tag information to dynamically modify the user-controlled character's animation and the animation of the object in the three-dimensional virtual environment associated with the tag in real time;

wherein the tag is defined at the location such that the tag is at least initially not apparent to the user.

2. The method of claim 1, further including detecting when the character is no longer within the predetermined proximity to the tag and, upon such detection, returning to the scripted animation for the character.

3. The method of claim 1, further including using key frames, inbetweening and inverse kinematics to dynamically modify the character's animation when in proximity to the tag.

4. The method of claim 1, further including defining a human-like reaction as the type of reaction and dynamically generating an animation that corresponds to the human-like reaction for the character when in proximity to the tag.

5. The method of claim 1, wherein dynamically modifying the character's animation in real time includes causing the character to look at the location in the virtual world where the tag has been defined.

6. The method of claim 1, further including defining a plurality of said tags at different locations in the virtual world and assigning tag information to each tag, wherein each tag causes a different dynamic animation sequence to be generated for the character when the character is within a predetermined proximity thereto.

7. A method for controlling the animation of a user-controlled character in a virtual three-dimensional world of a dynamic three-dimensional game space, comprising:

rendering the three-dimensional environment of the three-dimensional game space in which the user-controlled character will be animated;

defining a plurality of tags at defined locations with the three-dimensional virtual world that are external to the user-controlled character, wherein each tag is associated with an object and each tag designates a reaction to be made by the user-controlled character and the associated object when the character is within a predefined virtual proximity to the tag;

assigning a priority value to each tag;

allowing a user to control the movement of the user-controlled character within the virtual world;

when the user-controlled character is not within the predefined virtual proximity to any of the tags, using a stored animation sequence to animate the character within the virtual world; and, when the user-controlled character is within the predetermined virtual proximity to at least one of the tags, generating a dynamic animation sequence for the user-controlled character and the associated object in the three-dimensional virtual environment based on the tag having the highest priority among the tags within the predetermined proximity to the character; and using the location of the tag having the highest priority as a parameter for generating the dynamic animation sequence;

wherein the tag is at least initially not apparent to the user.

8. The method of claim 7, further including detecting when the character is no longer within the predetermined proximity to any of the tags and, upon such detection, returning to the stored animation sequence for the character.

9. The method of claim 7, further including using key frames, inbetweening and inverse kinematics to generate the dynamic animation sequence for the character.

10. The method of claim 7, further including defining a human-like reaction as the reaction for each tag.

11. The method of claim 7, wherein the dynamic animation sequence causes the character to look at the location in the virtual world where the tag has been defined.

12. A method for animating an object in a virtual three-dimensional world of a dynamic three-dimensional game space, comprising:

rendering the three-dimensional environment of the three-dimensional game space in which the object will be animated;

defining a tag in the three-dimensional virtual world at a location that is external to the object, wherein the tag includes a reaction code which designates a reaction for the object when the object is within a defined virtual proximity to the location of the tag;

moving the object within the virtual world using a stored animation sequence when the object is not within the defined virtual proximity to the tag;

dynamically generating an animation sequence for the object in the three-dimensional virtual environment corresponding to the reaction code in the tag information, at least one variable associated with the object, and based on the location of the tag when the object is within the defined virtual proximity to the tag; and, dynamically generating an animation sequence for an area in virtual proximity to the location of the tag;

wherein the tag is at least initially not apparent.

13. The method of claim 12, further including defining a plurality of said tags, wherein each tag has a different reaction code and is assigned a priority value, and further including using the priority value to determine which tag to base the dynamically generated animation sequence on when the object is within a defined proximity to more than one of the tags.

14. The method of claim 12, further including using key frames, inbetweening and inverse kinematics to generate the dynamic animation sequence for the object.

15. The method of claim 13, further including defining a human-like reaction as the reaction indicated by the reaction code for each tag.

16. The method of claim 15, wherein the dynamic animation sequence causes the object to look at the location in the virtual world where the tag has been defined.

* * * * *